US00RE50343E

(19) United States
(12) Reissued Patent
Kelley, Jr. et al.

(10) Patent Number: US RE50,343 E
(45) Date of Reissued Patent: Mar. 18, 2025

(54) SYSTEMS AND METHODS FOR PERFORMING COMPUTER NETWORK SERVICE CHAIN ANALYTICS

(71) Applicant: NetScout Systems, Inc., Westford, MA (US)

(72) Inventors: Bruce A. Kelley, Jr., Westford, MA (US); Gregory Mayo, Salem, NH (US)

(73) Assignee: NetScout Systems, LLC, Westford, MA (US)

(21) Appl. No.: 17/951,876

(22) Filed: Sep. 23, 2022

Related U.S. Patent Documents

Reissue of:
(64) Patent No.: 10,999,123
Issued: May 4, 2021
Appl. No.: 16/535,962
Filed: Aug. 8, 2019

U.S. Applications:
(63) Continuation of application No. 15/697,122, filed on Sep. 6, 2017, now abandoned.
(Continued)

(51) Int. Cl.
*H04L 12/14* (2024.01)
*G06F 9/455* (2018.01)
(Continued)

(52) U.S. Cl.
CPC ..... *H04L 41/0631* (2013.01); *G06F 9/45558* (2013.01); *G06F 9/5077* (2013.01);
(Continued)

(58) Field of Classification Search
CPC . H04L 41/0631; H04L 41/0681; H04L 43/06; H04L 43/0817; H04L 43/0852; H04L 67/10; G06F 9/45558; G06F 9/5077
See application file for complete search history.

(56) References Cited

U.S. PATENT DOCUMENTS 1,023,718 A1 3/2019 Paramasivam
10,237,187 B2 * 3/2019 Paramasivam ..... G06F 9/5083
(Continued)

FOREIGN PATENT DOCUMENTS

EP 2854347 A2 4/2015
WO WO-2016020380 A1 2/2016

OTHER PUBLICATIONS

Extended European Search Report for European Patent Application No. 17190014.5, dated Jan. 25, 2018, 3 pages.
(Continued)

*Primary Examiner* — Joshua D Campbell
(74) *Attorney, Agent, or Firm* — Foley & Lardner LLP

(57) ABSTRACT

A system for performing computer network service chain analytics includes network-connected devices containing a plurality of virtual network functions having elements and a data model for storing a plurality of metrics related to the plurality of virtual network functions and a service chain intelligence engine in communication with the one or more network-connected devices and the data model. The memory device contains a set of instructions that causes a processor to analyze the plurality of virtual network functions to automatically identify one or more service chains, to automatically determine, using the data model, performance behavior characteristics of each element for each of the identified service chains and to automatically generate an alarm, in response to determining that the performance behavior characteristics of one or more elements of at least one of the identified one or more service chains does not meet a predefined set of the performance behavior characteristics.

17 Claims, 3 Drawing Sheets

Related U.S. Application Data

(60) Provisional application No. 62/384,523, filed on Sep. 7, 2016.

(51) Int. Cl.

| | |
|---|---|
| ***G06F 9/50*** | (2006.01) |
| ***H04L 12/26*** | (2006.01) |
| ***H04L 29/08*** | (2006.01) |
| ***H04L 41/0631*** | (2022.01) |
| ***H04L 41/0681*** | (2022.01) |
| ***H04L 43/06*** | (2022.01) |
| ***H04L 43/0817*** | (2022.01) |
| *H04L 43/0852* | (2022.01) |
| *H04L 67/10* | (2022.01) |

(52) U.S. Cl.
CPC ..... *H04L 41/0681* (2013.01); *H04L 43/06* (2013.01); *H04L 43/0817* (2013.01); *H04L 43/0852* (2013.01); *H04L 67/10* (2013.01)

(56) References Cited

U.S. PATENT DOCUMENTS

| | | | | |
|---|---|---|---|---|
| 2014/0050223 | A1 | 2/2014 | Foo et al. | |
| 2015/0326535 | A1 | 11/2015 | Rao et al. | |
| 2016/0020959 | A1 | 1/2016 | Rahaman | |
| 2016/0179582 | A1 | 6/2016 | Skerry et al. | |
| 2016/0182458 | A1 | 6/2016 | Shatzkamer et al. | |
| 2016/0352578 | A1* | 12/2016 | Chen | H04L 43/0811 |
| 2017/0318097 | A1 | 11/2017 | Drew et al. | |
| 2017/0339072 | A1* | 11/2017 | Pignataro | H04L 45/566 |
| 2018/0007125 | A1* | 1/2018 | Onno | H04L 41/0895 |

OTHER PUBLICATIONS

Rost et al., "Service Chain and Virtual Network Embeddings: Approximations using Randomized Rounding", ARXIV.com, 2016, 27 pages.

Extended European Search Report for European Patent Application No. 17190014.5, dated Jan. 25, 2018.

Rost, M., et al, Service Chain and Virtual Network Embeddings: Approximations using Randomized Rounding; arXiv: 1604.02180v1 [cs.NI] Apr. 7, 2016.

* cited by examiner

SYSTEMS AND METHODS FOR PERFORMING COMPUTER NETWORK SERVICE CHAIN ANALYTICS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[CROSS REFERENCE TO RELATED APPLICATION] *CROSS-REFERENCE TO RELATED PATENT APPLICATIONS*

[This application is a continuation of U.S. patent application Ser. No. 15/697,122 filed Sep. 6, 2017 which claims priority to and the benefit of, pursuant to 35 U.S.C. § 119(e), U.S. provisional patent application Ser. No. 62/384,523, filed Sep. 7, 2016, entitled "SYSTEM AND METHODS FOR PERFORMING COMPUTER NETWORK SERVICE CHAIN ANALYTICS," which is incorporated herein in its entirety by reference.] *This application is a reissue of U.S. Pat. No. 10,999,123, issued on May 4, 2021, which claims priority to U.S. application Ser. No. 16/535,962, filed on Aug. 8, 2019, which is a continuation of U.S. patent application Ser. No. 15/697,122 filed Sep. 6, 2017 which claims priority to and the benefit of, pursuant to 35 U.S.C. § 119(e), U.S. provisional patent application Ser. No. 62/384,523, filed Sep. 7, 2016, entitled "SYSTEM AND METHODS FOR PERFORMING COMPUTER NETWORK SERVICE CHAIN ANALYTICS," which patent and applications are incorporated herein by reference in their entirety.*

FIELD OF THE INVENTION

The disclosed embodiments generally relate to service-centric and logical function oriented network architectures for data centers, and more particularly, to performing service chain analytics for macro and micro elements in a computer network service chain.

BACKGROUND

Using network function virtualization (NFV) and software defined networking (SDN), deployments utilizing service chain architecture are becoming more common. For example, a service chain deployment may involve a number of virtualized network functions (VNFs) connected or chained together to perform one or more services. In this example, each virtualized network function may include one or more virtual machines (VMs), virtualization containers, and/or other software implemented using various hardware. While SDN and NFV may reduce the need for specialized hardware for network functions or related service, issues can arise when deploying virtualized network functions across complex network topologies. For example, provisioning, testing, troubleshooting, and isolating faults can be more difficult in environments that use NFV.

Accordingly, a need exists for methods, systems, and computer readable media for provisioning NFV.

SUMMARY

Certain aspects of the present disclosure relate to performing computer network service chain analytics.

In accordance with a purpose of the illustrated embodiments, in one aspect, a system for performing computer network service chain analytics includes one or more network-connected devices containing a plurality of virtual network functions having one or more elements. The system further includes a data model for storing a plurality of metrics related to the plurality of virtual network functions. The system also includes a service chain intelligence engine including a processor and a memory device coupled to the processor in communication with the one or more network-connected devices and in communication with the data model. The memory device contains a set of instructions that, when executed by the processor, cause the processor to analyze the plurality of virtual network functions to automatically identify one or more service chains. The set of instructions that, when executed by the processor, further cause the processor to automatically determine, using the data model, performance behavior characteristics of each element for each of the identified service chains and to automatically generate an alarm, in response to determining that the performance behavior characteristics of one or more elements of at least one of the identified one or more service chains does not meet a predefined set of the performance behavior characteristics.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment.

DESCRIPTION OF CERTAIN EMBODIMENTS

Figure 1:
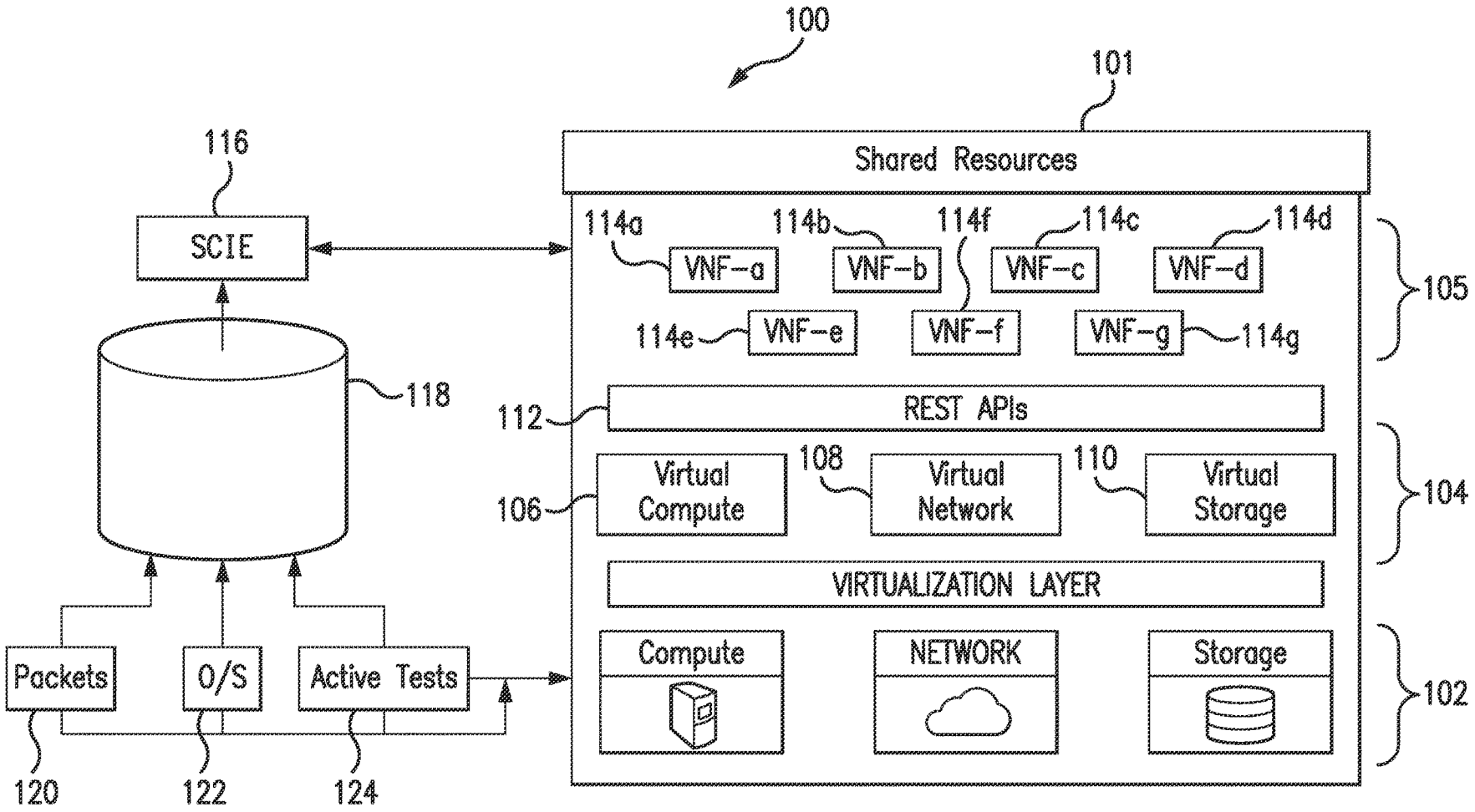
FIG. 1 is a diagram illustrating elements or components of an example operating environment in which embodiments of the present invention may be implemented.

The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that an NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with particular service type or a service instance.

In various embodiments, a network of wired and/or wireless nodes uses a Network Function Virtualization (NFV) Infrastructure (NFVI). By using an NFVI, network functions can be instantiated at a variety of different locations where underlying hardware infrastructure is available. Network functions can be placed where they are needed, when they are needed, and can then be either taken down or moved according to the needs of the network. The VNFs that may be supported by the NFV infrastructure may include, for example, functions for flow control (e.g., including ordering and rate matching), reliability (e.g., including data loss identification, data loss indication, and data recovery), security (e.g., including end-to-end or network security), data forwarding, out-of-order control (e.g., including packet sequence numbers), fragmentation/reassembly, compression, congestion, error control, named content delivery (e.g., including content interest storage, content holder identification, content data blocks caching, content identification and content security verification), data aggregation (e.g., reverse multicast aggregation), data holding (e.g., delay-tolerant networking functions and retransmissions), and other functions. Some VNFs that are instantiated on end or edge nodes may perform functions that are end-to-end functions in a path across the network. Some VNFs for performing, e.g., a reliability function, may be instantiated, in a link connecting a pair of nodes and/or in multiple-links over many nodes along a network path. Further, some VNFs may be configured to work at different levels of complexity or increased functionality (e.g., security function). The use of VNFs is one example of virtualization, which provides the ability to elastically support the functional demands of a network by allowing the functions that were formerly discrete hardware resources to be virtualized, i.e., defined in software, on an underlying pool of physical resources. For example, a VNF may be virtualized as a single resource entity even when the underlying hardware resources supporting the VNF are not all physically co-located or only include a portion of the component resources of individual physical devices.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers.

In accordance with one or more embodiments discussed here, described are: service-centric and logical function oriented network architectures for data centers, a key enabling technique, and a Virtual Network Function (VNF) service chain entity as defined below. In accordance with the disclosed service-centric architecture, connectivity and networking services can be provided by service-customized virtual networks (SCVNs).

FIG. 1 is a diagram illustrating elements or components of an example operating environment in which embodiments of the present invention may be implemented. In this example operating environment users can actively define, manage, and operate their virtual networks without reliance on network provider technicians, as was necessitated by prior art techniques. It is to be appreciated various embodiments disclosed herein result in a transformation of network architecture, operation, and management.

In accordance with an illustrative embodiment the architecture of the SCVN 100 includes at least one hardware layer 102, a virtualization layer 104, and operations and management layer 105. The hardware layer 102 preferably includes a pool of physical computing, networking and storage resources.

In the example shown in FIG. 1, the virtualization layer 104 may include one or more layers of software for performing one or more types of functions including, but not limited to, managing virtualization of hardware resources 102 and managing services within one or more nodes.

In the example, the virtualization layer 104 includes one or more controllers or services for managing one or more virtual machines (VMs), where each of VM is a collection of resources, such as virtual or physical processor, memory and I/O resources, from among hardware resources 102, that are defined to run an operating system. Each VM may be virtualized as a separate computer. Each VM may host a separate operating system. Multiple VMs may access memory from a common memory chip; however, the ranges of addresses directly accessible to each of the VMs do not overlap. Processors may be dedicated to a single VM or shared by multiple VMs. The virtualization layer 104 may include only a single VM or may include additional or alternate VMs.

In additional or alternate embodiments, the virtualization layer 104 preferably provides multi-cloud aggregation and may include components that are distributed across multiple clouds and that cooperate to provide various services, such as, but not limited to, virtual computing 106, virtual network 108 and virtual storage 110. In particular embodiments, virtual computing 106 (e.g., application, server software, software development environment, software test environment) comprises one or more units of computing processing that is performed via an infrastructure-as-a-service (IaaS) platform-as-a-service (PaaS), or software-as-a-service (SaaS). For example, IaaS may comprise instances of Microsoft® Windows or Linux running on a virtual computer, or a Desktop-as-a-service (DaaS) provided by Citrix® or VMWare®; a PaaS may comprise a database server (e.g., MySQL® server), Samba server, Apache® server, Microsoft® IIS.NET server, Java® runtime, or Microsoft®.NET® runtime, Linux-Apache-MySQL-PHP (LAMP) server, Microsoft® Azure, or Google® AppsEngine; a SaaS may comprise SalesForce®, Google® Apps, or other software application that can be deployed as a cloud service, such as in a web services model. A cloud-computing resource may be a physical or virtual computing resource. In some embodiments, the virtual storage 110 may include one or more cloud-computing storage resources (e.g., Storage Area Network (SAN), Network File System (NFS) or Amazon S3®) and the virtual network 108 may include one or more network resources (e.g., firewall, load-balancer, or proxy server). Furthermore, the virtualization layer 104 may include an internal private resource, all external private resource, a secure public resource, an infrastructure-as-a-service (IaaS) resource, a platform-as-a-service (PaaS) resource, or a software-as-a-service (SaaS) resource. Hence, in some embodiments, a cloud-computing service provided by the virtualization layer 104 may comprise a IaaS, PaaS, or SaaS provided by private or commercial (e.g., public) cloud service provider, such as Amazon Web Services®, Amazon EC2®, GoGrid®, Joyent®, Mosso®, or the like.

In the operations and management layer 105 (with Software Defined Network (SDN)), network functions may be virtualized to provide a VNF. It is to be understood that VNF component 114a-114g examples may include (and are not to be limited to): firewalls, packets inspection, Network Operator's backbone systems like Mobility Management Entity (MME), Packet Data Network (PDN) gateway, and the like. It is to be further understood these VNFs may be provisioned, deployed, executed, and deleted in a Software Defined Infrastructure (SDI). Such SDIs may include a set of VNFs that are interconnected through the network to support one or more applications.

Communication between the virtual layer 104 and the VNFs 114 a-g may be done through various protocols and architectural styles, including, but not limited to, Simple Object Access Protocol (SOAP), eXtensible Markup Language (XML), Simple Network Management Protocol (SNMP), and Representational State Transfer (REST). FIG. 1 illustrates in an embodiment in which communication between the virtual layer 104 and the VNFs 114a-g is implemented using the REST Application Programming Interface (REST API) 112.

It should be noted that conventional, prior art, network services typically require acquiring hardware components, which provide a transmission medium, such as coaxial cable or twisted pair. Furthermore, each service request typically requires specialized resources/interfaces (e.g., specialized hardware, databases, I/O devices, or any other device with its own command syntax, etc.), which increases the chances of configuration errors. In contrast, the illustrated embodiments described herein set forth a network architecture in which network functions are moved into the SDI. In accordance with aspects of the embodiments, techniques are provided for maximizing data center resources while at the same time minimizing compute bottlenecks that impact the ability to handle customer application load. NFV/SDN and data center cloud service assurances, often included in service level agreements (SLAs), are necessary to achieve a "programmable network" (e.g., SDI, NFV). Service assurances depend on the availability of hardware resources 102 to handle increased customer usage. As concerns over security and storage usage grow so too does the demand for the processing power to handle compute-intensive security operations (e.g., authentication, and data encryption/decryption). Securing and storing data is compute-intensive, so much so that specialize hardware-acceleration is used frequently to handle (or offload) tasks that if done on general purpose CPUs would be costly both in terms of CPU and latency. The embodiments provide a method of managing a pool of hardware resources together with a group of virtual machines and virtual network functions. In practical terms, the embodiments of the present invention help data centers get the most out of the equipment (i.e., Servers) they have.

The illustrated NFV platform 101 may include a master service orchestrator (not shown in FIG. 1) that orchestrates instantiation of VNFs 114a-114g and management of VNFs 114a-114g, including performance tuning as needed, to provide one or more of the services to users (e.g., UEs). More particularly, the master service orchestrator may perform orchestration operations to instruct a plurality of VNF service controllers to control a plurality of VNF pools, each containing one or more virtual resources for a specific type of VNF. In this manner, the master service orchestrator provides an intelligent orchestration layer for VNF-based service chaining and resource sharing.

One illustrative advantage of this embodiment is that configuring/constructing a VNF service chain no longer requires acquiring hardware resources (as was required with the aforesaid prior art techniques). For example, a security monitoring VNF may be configured to receive provisioning data from the NFV security services controller. Thus, the present invention SDN/VNF infrastructure significantly simplifies at least the service chain and application provisioning process. It is to be appreciated the services that VNF service chains may provide include, for instance, Voice-over-IP (VoIP), Video-on-Demand (VOD), IP Mobility Subsystem (IMS) and other mobility services, and Internet services to clients of a service provider network. Typically, each service chain has a specific order. For example, a mobility management entity (MME) interface application may be a part of an MME virtualized network function chain provided by a virtual server executing in a virtual computing environment, such as the SCVN 100.

Furthermore, the illustrated embodiments of the present invention encompass an automated, service chain health analysis system (referred to hereinafter as a Service Chain Intelligence Engine (SCIE)) 116 which dynamically matches, analyzes and transforms internal and external data. More specifically, the SCIE 116 is configured to automatically evaluate the health and performance of various elements in VNF service chains (i.e., macro and micro elements discussed below in conjunction with FIG. 2) via a common data model 118. The data model 118 is configured for storing service chain element health metrics, dimensions and normal behavior metrics representing metric values associated with normal operation of a particular VNF service chain. According to embodiments of the present invention, it should be noted that the d stored in the data model 118 gets derived from packet d 120, operating system data 122 and active agent measurements 124. In some embodiments, obtaining the plurality of packet data, O/S data and active agent measurement values is carried out by a plurality of monitoring probes monitoring usage (including normal usage) of the hardware resources 102. Advantageously, the data model 118 provides an optimized and scalable design model. Examples of data that can be stored in the data model 118 may include, but are not limited to, multi-dimensional data (i.e., subscriber data, application data, device data, service data, etc.), a plurality of application/network metrics (i.e., traffic volume, error causes, response time, packet loss data, jitter, etc.) and various OS related metrics (i.e., CPU utilization data, memory utilization data, disk utilization data, etc.). In other words, the SCIE 116 may be configured to determine the health and performance of particular VNF elements by evaluating a common set of metrics/tests as well as using domain knowledge.

Figure 2:
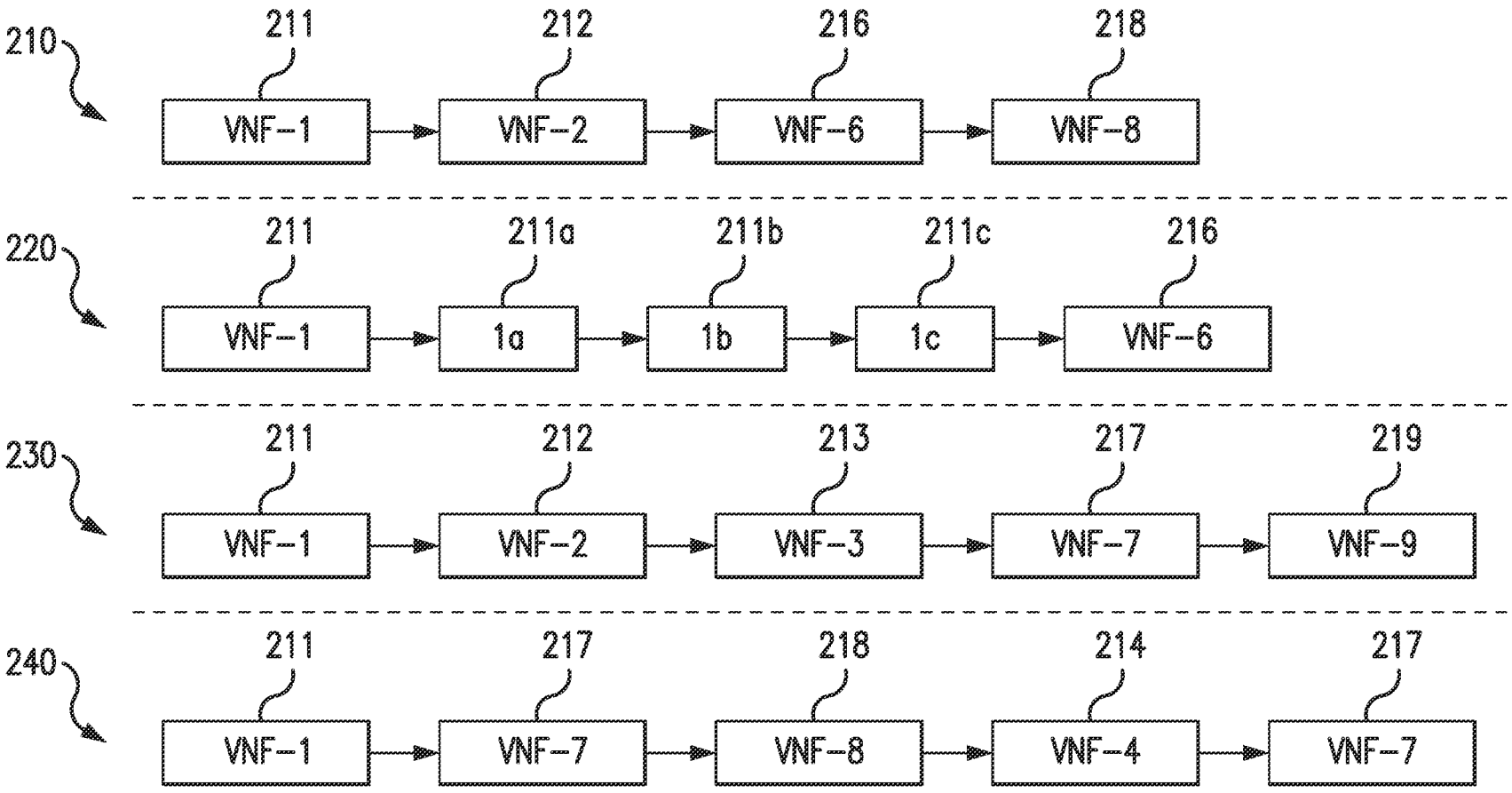
FIG. 2 illustrates examples of service chains implemented using VNFs.

FIG. 2 illustrates exemplary ways to implement special-purpose service chains using VNFs, according to some embodiments of the invention. More specifically, FIG. 2 illustrates a plurality of service chains 210, 220, 230, 240 created using at least two of the plurality of NFV-based applications based on the information communicated between the plurality of NFV-based applications. At least in some instances, the information can be communicated using, for example, border gateway protocol (BGP) exchanges between the NFV-based applications. For example, a first service chain 210 comprising elements 211-218 may represent a voice and video service chain. It is to be appreciated that in accordance with the illustrated embodiments, each VNF service chain 210, 220, 230, 240 may include a plurality of VNF macro elements and may include two or more VNF micro elements.

It is to be understood, in at least some embodiments, at least some of the provided services can be implemented as a sequence of steps. For instance, in one embodiment, the Dynamic Rate Allocation (DRA) VNF service/network function may include a sequence of micro steps, such as DRA steps one, two and three required to implement the DRA service. In FIG. 2, a second service chain 220 represents the DRA VNF service network function and elements 211a, 211b and 211c represent micro elements. In other words, each of the steps required to implement the DRA service is represented in a corresponding VNF service chain 220 as a VNF micro element 211a-211c.

A third 230 and fourth 240 service chains illustrate chains consisting of only macro elements 211, 212, 213, 217, 219 and 211, 217, 218, 214, 217, respectively. Examples of such VNF macro elements include (and are not limited to) DRA service/network function, Load Balancer service/network functions, Firewall service/network function, and the like. It is to be understood, the SCIE 116 is configured to determine the health of a variety of different macro VNF elements (e.g., elements 211-218) and/or micro VNF elements 211a-c. The SCIE 116 finds use in a variety of different "normalized" methods well-known in the art for any type of VNF to determine health of macro and/or micro elements. Each service chain performs a specific service and has a specific order. For instance, each service chain may process a specific service flow of network traffic. Some steps may be repeated more than once at different points within the service chain flow (e.g., elements 217 in the fourth service chain 240).

Figure 3:
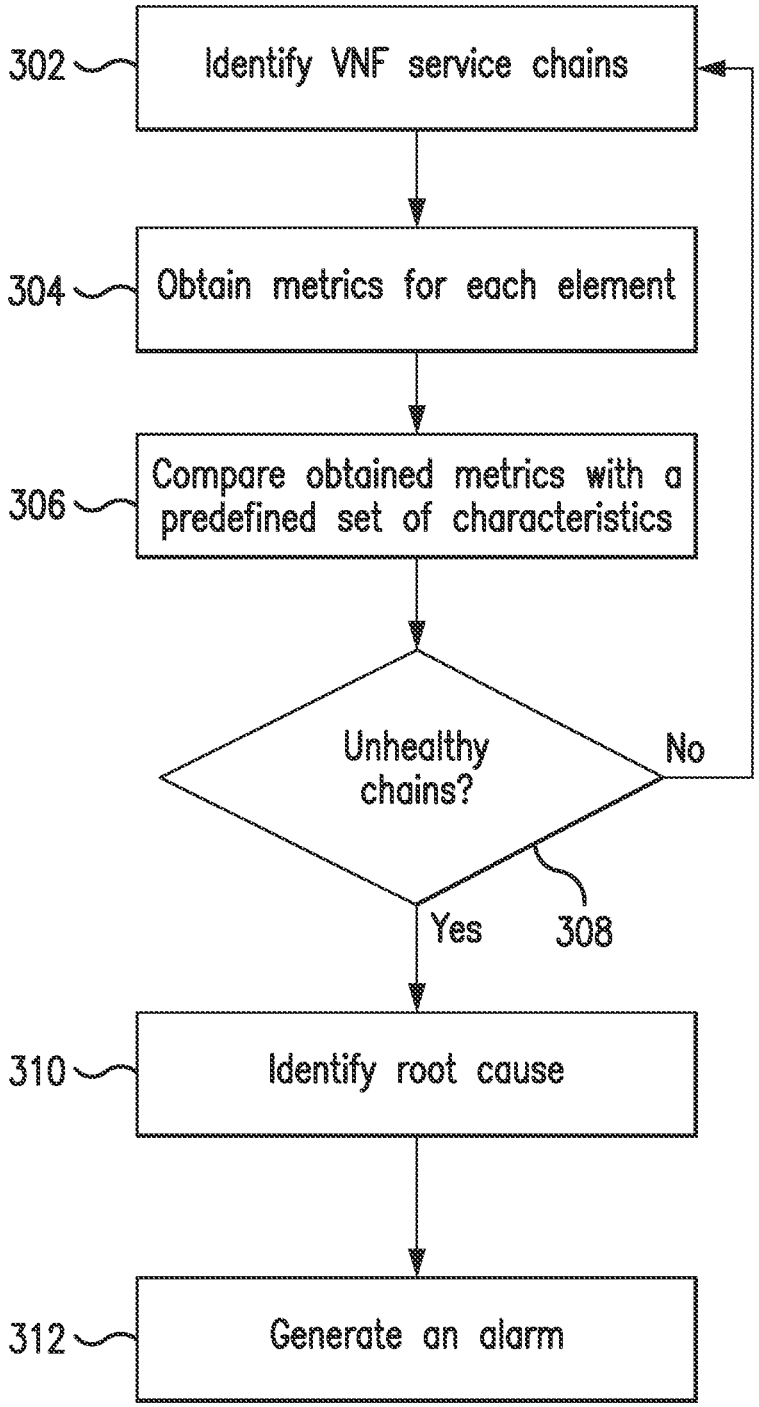
FIG. 3 schematically shows a workflow of the steps performed by a service chain intelligence engine (SCIE), according to certain embodiments of the present disclosure.

Before turning to description of FIG. 3, it is noted that the flow diagram shown therein is described, by way of example, with reference to components shown in FIGS. 1-2, although these operational steps may be carried out in any system and are not limited to the scenario shown in the aforementioned figures. Additionally, the flow diagram in FIG. 3 illustrates an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

As shown in FIG. 3, at step 302, SCIE 116 starts the method by identifying VNF service chains. According to example embodiments, the master service orchestrator (not shown in FIG. 1) executed by the NFV platform 101 not only can allocate virtualized network functions for creation of a virtualized network service, but the master orchestrator also can identify each of the virtualized network functions as interdependent for coordinated execution of the virtualized network service, based on setting by the orchestrator an interdependency indicator within each virtualized container associated with providing a corresponding virtualized network function for the virtualized network service. The interdependency indicator can create a "stateful" condition in the virtualized container, enabling the virtualized container to utilize the interdependency indicator as a "pointer" toward a virtualized management entity associated with the virtualized network service.

In one embodiment, at step 302, the SCIE 116 may receive pointers to one or more virtualized management entities from the master service orchestrator. The virtualized management entity, executed for example as part of the SCIE 116, can receive information associated with the performance of the virtualized container within the context of the virtualized network service; hence, the SCIE 116 can monitor the performance of each VNF and each individual VNF element within the context of the virtualized network service, and execute coordinated changes among the virtualized network functions associated with the virtualized network service.

Next, at step 304, the SCIE 116 obtains metrics for each VNF element. A VNF element may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF element providing a particular function (e.g. to a particular customer, entity, etc.) may have further requirements, or modified requirements, for example, associated with a particular quality of service (QoS) or SLA. Such requirements may include maximum latency or delay, average latency and maximum variance (latency jitter), maximal allowed packet loss, etc. Other requirements may include service availability, redundancy, backup, provisions for roll-back and/or recovery, fault-tolerance, and/or fail-safe operation, etc.

A service made of a chain or a group of VNFs and their VNF elements may have a similar list of requirements, or specifications, covering the service as a whole. Therefore, such requirements, or specifications, may imply, affect, or include, requirements, or specifications, regarding communication links between the VNFs and/or the VNF elements. Such requirements, or specifications, may include bandwidth, latency, bit-error rate, and/or packet loss, etc. Such communication requirements or specifications may further impose deployment limitations, or constraints, requiring particular VNFs and/or VNF elements to reside in the same data-center, or within the same rack, or even in the same computing device, for example, sharing memory or being executed by the same processor. Security measures may add further requirements, or specifications, such as co-location of some of the VNFs and/or the VNF elements. Thus, at step 304, the SCIE 116 obtains metrics related to various aforementioned requirements and specifications. As noted above, such metrics may be captured by a plurality of monitoring probes. Furthermore, according to embodiments of the present invention, the SCIE 116 is configured and operable to utilize "active agent" test data. As used herein, "active agent" refers to a common piece of code preferably inserted into each VNF element to perform pre-determined availability and latency tests within various links of VNF service chains. In one embodiment, such availability and latency tests may be implemented using code embedded into each VNF element. Alternatively, such tests could be performed from a plurality of distributed points within the SDI.

At 306, the SCIE 116 compares the measurements obtained at 304 with a predefined set of requirements and specifications associated with each VNF and/or VNF element. For instance, the SCIE 116 may be configured to determine existence of the appropriate protocols for a particular VNF element, determine if traffic volumes/ratios are appropriate, if success/failure rates exceed typical success/failure rates, if response time is within an acceptable range, and the like. Furthermore, the SCIE 116 may evaluate misbehaving TCP metrics for each VNF element.

At 308, the SCIE 116 determines if there are any unhealthy VNF service chains. In other words, the SCIE 116 attempts to identify all chains that are not performing according to specifications and/or service chains that do not meet one or more predefined requirements. In response to determining that all service chains are performing as expected (decision block 308, "No" branch), the SCIE 116 returns back to step 302 and periodically repeats steps 304-308.

In response to determining that one or more service chains are not performing as expected, at step 310, the SCIE 116 may optionally perform additional analysis to identify a root cause of "unhealthy" service chain. Any metric indicating a particular event that caused a change in service state/performance can be evaluated. Alternatively, any service chained element and/or interdependency between elements can be evaluated by the SCIE 116. There might be multiple service chain elements associated with a particular root cause, when it is evaluated.

Once the SCIE 116 identifies a root cause, at step 312, the SCIE 116 may generate an alarm notification. In one embodiment, the SCIE 116 may include a graphical user interface (GUI) presenting users with visual alarm notifications for a plurality of VNF service chains. In an embodiment, these notifications may comprise real-time alarm notifications that provides an indication of one or more issues (root causes) affecting a specific service chain, for example.

In summary, various embodiments of the present invention are directed to a plurality of VNFs that are interconnected through the network to support an application. The disclosed SCVN environment 100 facilitates a shorter and simpler service chain and application provisioning process. Advantageously, moving network functions to software/virtual layer means that building a service chain no longer requires acquisition of hardware resources. Various embodiments of the present invention contemplate using a common data model for storing service chain element health metrics, dimensions and normal behavior metrics. Furthermore, various embodiments of the present invention are directed to an automated service chain intelligence engine (SCIE 116) that is configured to use information stored in the data model to identify any performance issues indicative of health of a plurality of service chain elements.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed:

1. A computer system [for performing computer network service chain analytics, the system] comprising:

one or more network-connected devices containing a plurality of virtual network functions (VNFs) having one or more elements wherein at least some of the VNFs include one or more VNF service chains each having two or more macro and micro elements;

a data model [for storing] *configured to store* a plurality of metrics related to the plurality of VNFs; and

[a service chain intelligence engine comprising] a processor and a memory device coupled to the processor in communication with the one or more network-connected devices and in communication with the data model, the memory device containing a set of instructions that, when executed by the processor, cause the processor to:

analyze the plurality of VNFs to automatically identify one or more service chains;

automatically determine performance behavior characteristics of each element for each of the identified service chains [using the data model] by automatically determining performance behavior characteristics of both macro and micro elements in the one or more VNF service chains using the data model and by employing active agent test data wherein the active agent test data is a common piece of code inserted into each VNF element to perform predetermined availability and latency tests within certain links of the one or more VNF service chains; and automatically generate an alarm, in response to determining that the performance behavior characteristics of one or more elements [of at least one of the identified one or more service chains] does not meet a predefined set of the performance behavior characteristics.

2. The computer system of claim 1, wherein *the plurality of VNFs further include* services provided in the VNF service chains [comprise one or more of: Voice-over-IP (VoIP), Video-on-Demand (VOD), IP Mobility Subsystem (IMS) and Internet services] to clients of a service provider network.

3. The computer system of claim 1, wherein the data model is configured [for storing] *to store* service chain element health [Metrics] *metrics*, dimensions and normal behavior metrics.

4. A [computer] method [for performing computer network service chain analytics, the method] comprising[steps of]:

analyzing a plurality of virtual network functions (VNFs) having one or more elements to automatically identify one or more *VNF* service chains wherein each of the one or more VNF service chains includes two or more VNF micro elements;

automatically determining performance behavior characteristics of each element for each of the identified service chains using a data model for storing a plurality of metrics related to the plurality of VNFs by automatically determining performance behavior characteristics of both macro and micro elements in the one or more VNF service chains using the data model and by employing an active agent test that is a common piece of code inserted into each VNF element to perform pre-determined availability and latency tests within certain links of the one or more VNF service chains; and automatically generating an alarm, in response to determining that the performance behavior characteristics of one or more elements [of at least one of the identified one or more service chains] does not meet a predefined set of the performance behavior characteristics.

5. The [computer] method of claim 4, wherein at least some of the plurality of VNFs comprise [one or more] *a plurality of* VNF service chains.

6. The [computer] method of claim 4, wherein *at least one of the VNFs further includes* services provided in the VNF service chains [comprise one or more of: Voice-over-IP (VoIP), Video-on-Demand (VOD), IP Mobility Subsystem (IMS) and Internet services] to clients of a service provider network.

7. The [computer] method of claim [4] *6*, wherein each of the one or more VNF service chains comprises a plurality of VNF macro elements.

*8. The system of claim 2, wherein the services comprise one or more of:*

*Voice-over-IP (VoIP);*

*Video-on-Demand (VOD);*

*IP Mobility Subsystem (IMS); and*

*Internet services.*

*9. The system of claim 1, wherein the performance behavior characteristics correspond to macro and micro elements in the one or more VNF service chains.*

*10. The method of claim 4, further comprising identifying an unhealthy service chain.*

*11. The method of claim 10, further comprising identifying a root cause of the unhealthy service chain.*

*12. A non-transitory computer-readable media comprising computer-executable instructions embodied thereon that, when executed by a processor, cause the processor to perform a process comprising:*

*analyzing a plurality of virtual network functions (VNFs) having one or more elements to automatically identify one or more VNF service chains wherein each of the one or more VNF service chains includes two or more VNF micro elements;*

*automatically determining performance behavior characteristics of each element for each of the identified service chains using a data model for storing a plurality of metrics related to the plurality of VNFs by automatically determining performance behavior characteristics of both macro and micro elements in the one or more VNF service chains using the data model and by employing an active agent test that is a common piece of code inserted into each VNF element to perform pre-determined availability and latency tests within certain links of the one or more VNF service chains; and*

*automatically generating an alarm, in response to determining that the performance behavior characteristics of one or more elements does not meet a predefined set of the performance behavior characteristics.*

*13. The non-transitory computer-readable media of claim 12, wherein the VNFs include a plurality of the VNF service chains, each having two or more macro and micro elements.*

*14. The non-transitory computer-readable media of claim 13, wherein the performance behavior characteristics correspond to macro and micro elements in one or more of the VNF service chains.*

*15. The non-transitory computer-readable media of claim 12, further comprising computer-executable instructions embodied thereon that, when executed by a processor, cause the processor to identify an unhealthy service chain.*

*16. The non-transitory computer-readable media of claim 15, further comprising computer-executable instructions embodied thereon that, when executed by a processor, cause the processor to identify a root cause of the unhealthy service chain.*

*17. The non-transitory computer-readable media of claim 12, wherein the VNFs further include services provided in VNF service chains to clients of a service provider network.*

* * * * *